(12) United States Patent
Mossman (10) Patent No.: US 10,537,063 B2
(45) Date of Patent: Jan. 21, 2020

(54) FOLDING AGRICULTURAL HEAD

(71) Applicant: Deere & Company, Moline, IL (US)

(72) Inventor: Michael W. Mossman, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 148 days.

(21) Appl. No.: 15/729,867

(22) Filed: Oct. 11, 2017

(65) Prior Publication Data

US 2019/0104683 A1 Apr. 11, 2019

(51) Int. Cl.
*A01D 41/14* (2006.01)

(52) U.S. Cl.
CPC .................. *A01D 41/144* (2013.01)

(58) Field of Classification Search
CPC .... A01D 41/144; A01D 45/021; A01D 34/04; A01D 34/661; A01D 41/14; A01B 73/06; A01B 73/044; A01B 73/065
See application file for complete search history.

(56) References Cited

U.S. PATENT DOCUMENTS

| | | | |
|---|---|---|---|
| 2,608,041 A | 8/1952 | Schoenrock | |
| 3,468,107 A * | 9/1969 | Van Der Lely | A01D 41/144 56/11.9 |
| 3,683,601 A * | 8/1972 | Van der Lely | A01D 41/144 56/6 |
| 4,487,004 A | 12/1984 | Kejr | |
| 5,464,371 A | 11/1995 | Honey | |
| 5,577,563 A * | 11/1996 | Holen | A01B 73/044 111/57 |
| 5,673,543 A * | 10/1997 | Richardson | A01D 41/144 56/228 |
| 5,724,798 A * | 3/1998 | Stefl | A01D 41/144 172/311 |
| 5,845,472 A | 12/1998 | Arnold | |
| 6,003,615 A | 12/1999 | Moore | |

(Continued)

FOREIGN PATENT DOCUMENTS

| | | |
|---|---|---|
| EP | 0750833 | 1/1997 |
| EP | 2842407 A1 | 3/2015 |

(Continued)

OTHER PUBLICATIONS

European Patent Office Search Report for Application No. 182004093 dated Mar. 15, 2019 (7 pages).

(Continued)

*Primary Examiner* — Arpad Fabian-Kovacs
(74) *Attorney, Agent, or Firm* — Michael Best & Friedrich LLP (57) ABSTRACT

A head for an agricultural machine includes a frame with a center segment defining a first longitudinal axis and a wing defining a second longitudinal axis. The head also includes a motion control assembly connecting the center segment and the wing such that the wing is movable relative to the center segment between a deployed position and a non-deployed position. The motion control assembly is configured to maintain the second longitudinal axis in a parallel relationship with the first longitudinal axis as the wing moves between the deployed position and the non-deployed position, and the wing is movable from the deployed position to the non-deployed position along a continuous arc.

20 Claims, 8 Drawing Sheets

(56) References Cited

U.S. PATENT DOCUMENTS

| | | |
|---|---|---|
| 6,202,397 B1 | 3/2001 | Watts et al. |
| 6,675,568 B2 | 1/2004 | Patterson et al. |
| 6,865,871 B2 | 3/2005 | Patterson et al. |
| 7,168,226 B2 | 1/2007 | McLean et al. |
| 7,470,180 B2 | 12/2008 | Honey |
| 7,540,130 B2 | 6/2009 | Coers et al. |
| 7,587,885 B2 | 9/2009 | Tippery et al. |
| 7,802,417 B2 | 9/2010 | Sauerwein et al. |
| 7,918,076 B2 | 4/2011 | Talbot |
| 7,992,372 B1 | 8/2011 | Coers et al. |
| 8,087,224 B1 | 1/2012 | Coers et al. |
| 8,281,561 B2 | 10/2012 | Dow et al. |
| 8,336,280 B2 | 12/2012 | Lovett et al. |
| 8,393,135 B2 | 3/2013 | Honas et al. |
| 8,544,250 B2 | 10/2013 | Lovett et al. |
| 9,072,222 B2 | 7/2015 | Bomleny et al. |
| 9,144,199 B2 | 9/2015 | Ritter et al. |
| 9,161,492 B2 | 10/2015 | Fuechtling |
| 9,198,353 B2 | 12/2015 | Ritter et al. |
| 9,526,206 B2 | 12/2016 | Schulze Ruckamp et al. |
| 9,992,924 B2 | 6/2018 | van Vooren et al. |
| 10,070,575 B2 * | 9/2018 | Wenger ............... A01B 73/065 |
| 10,299,437 B2 | 5/2019 | Farley et al. |
| 2002/0035826 A1 * | 3/2002 | Albinger ............... A01D 41/144 56/109 |
| 2003/0074876 A1 | 4/2003 | Patterson et al. |
| 2003/0182912 A1 * | 10/2003 | Boll ..................... A01D 34/661 56/14.7 |
| 2003/0226342 A1 * | 12/2003 | Boeckmann ......... A01D 41/144 56/14.7 |
| 2004/0123575 A1 * | 7/2004 | Rickert ................ A01D 41/144 56/14.7 |
| 2005/0284124 A1 | 12/2005 | Patterson et al. |
| 2006/0225900 A1 | 10/2006 | Kimball |
| 2008/0072560 A1 | 3/2008 | Talbot |
| 2008/0161077 A1 | 7/2008 | Honey |
| 2008/0295473 A1 | 12/2008 | Tippery et al. |
| 2009/0320431 A1 | 12/2009 | Puryk et al. |
| 2012/0047866 A1 | 3/2012 | Fuechtling |
| 2012/0279191 A1 | 11/2012 | Sauerwein et al. |
| 2013/0097986 A1 | 4/2013 | Lovett et al. |
| 2014/0033670 A1 * | 2/2014 | Cressoni ............... A01D 41/144 56/104 |
| 2014/0041354 A1 | 2/2014 | Coon et al. |
| 2015/0013795 A1 | 1/2015 | Ritter et al. |
| 2015/0373907 A1 | 12/2015 | Schulze Ruckamp et al. |
| 2016/0183462 A1 | 6/2016 | Magisson et al. |
| 2016/0262301 A1 | 9/2016 | van Vooren et al. |
| 2016/0360699 A1 | 12/2016 | Allochis |
| 2017/0094904 A1 | 4/2017 | Sudhues et al. |
| 2017/0113876 A1 | 4/2017 | Jager et al. |
| 2017/0223896 A1 | 8/2017 | Schmid |
| 2017/0251606 A1 | 9/2017 | Van Overschelde et al. |
| 2017/0367266 A1 | 12/2017 | Vandendriessche et al. |
| 2018/0035598 A1 * | 2/2018 | Wenger ............... A01B 73/065 |
| 2018/0070526 A1 * | 3/2018 | Henry ................. A01B 73/046 |
| 2018/0084724 A1 | 3/2018 | Fuchtling |
| 2018/0338418 A1 | 11/2018 | Ricketts et al. |
| 2019/0045709 A1 * | 2/2019 | Schroeder ............ A01D 41/144 |
| 2019/0053429 A1 | 2/2019 | Cook et al. |

FOREIGN PATENT DOCUMENTS

| | | |
|---|---|---|
| EP | 3066910 A1 | 9/2016 |
| EP | 3087819 A2 | 11/2016 |

OTHER PUBLICATIONS

European Patent Office Search Report for Application No. 18200436.6 dated Mar. 19, 2019 (9 pages).

European Patent Office Search Report for Application No. 18199247.0 dated Mar. 22, 2019 (7 pages).

United States Patent Office Action for U.S. Appl. No. 15/730,442 dated Dec. 20, 2018 (18 pages).

United States Patent Office Action for U.S. Appl. No. 15/785,831 dated Jul. 3, 2019 (10 pages).

European Patent Office Search Report for Application No. 18199265.2 dated May 17, 2019 (12 pages).

* cited by examiner

FOLDING AGRICULTURAL HEAD

BACKGROUND

The present disclosure relates to agricultural equipment, and more particularly to agricultural heads capable of folding into a more compact position during transport.

SUMMARY

In one aspect of the disclosure, a head for an agricultural machine includes a frame with a center segment defining a first longitudinal axis and a wing defining a second longitudinal axis. The head also includes a motion control assembly connecting the center segment and the wing such that the wing is movable relative to the center segment between a deployed position and a non-deployed position. The motion control assembly is configured to maintain the second longitudinal axis in a parallel relationship with the first longitudinal axis as the wing moves between the deployed position and the non-deployed position, and the wing is movable from the deployed position to the non-deployed position along a continuous arc.

In another aspect of the disclosure, a combine includes a housing, a feederhouse coupled to a front end of the housing, and a head coupled to the feederhouse. The head has a frame with a center segment that defines a first longitudinal axis and that includes a first end surface. The head also has a wing that defines a second longitudinal axis and that includes a second end surface. The combine also includes a motion control assembly connecting the center segment and the wing such that the wing is movable relative to the center segment between a deployed position and a non-deployed position. The first end surface faces the second end surface when the wing is in the deployed position and faces away from the second end surface when the wing is in the non-deployed position. The first end surface and the first longitudinal axis define a first oblique included angle, and the second end surface and the second longitudinal axis define a second oblique included angle.

In another aspect, a head for an agricultural machine includes a frame having a center segment and a wing, and a motion control assembly connecting the center segment and the wing such that the wing is movable relative to the center segment between a deployed position and a non-deployed position. The head also includes a releasable pivot assembly selectively pivotally coupling the wing and the center segment when the wing is in the deployed position. The releasable pivot assembly has a projection located on one of the wing and the center segment and a saddle located on the other of the wing and the center segment. The saddle includes a recess configured to receive the projection when the wing is in the deployed position. The projection is insertable into recess and removable from the recess without linearly translating the wing relative to the center segment.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
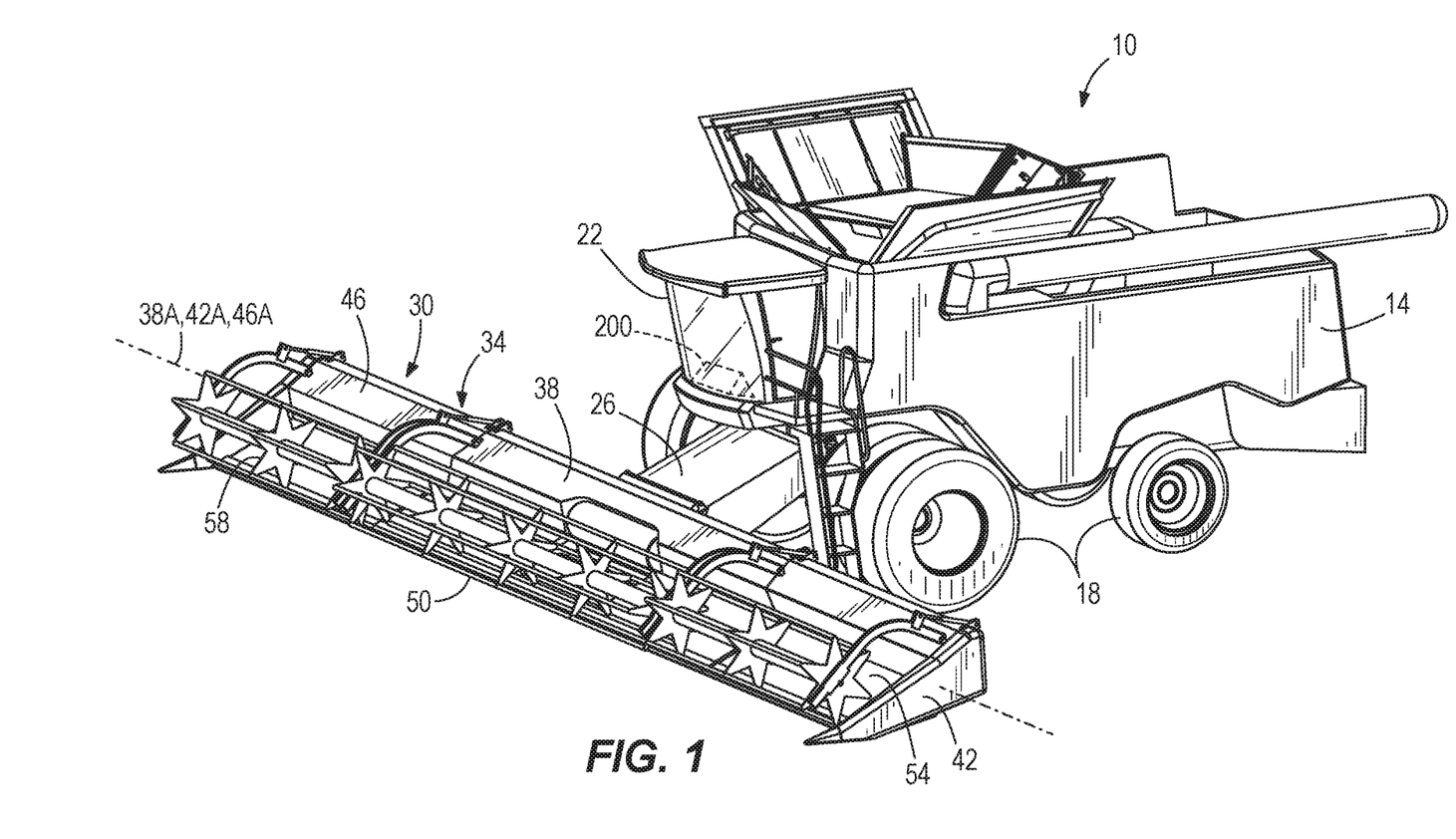
FIG. 1 is a perspective view of an agricultural machine including a folding head according to one embodiment of the disclosure.

FIG. 1 illustrates an agricultural machine 10, which is a combine harvester (or simply "combine") 10 in the illustrated embodiment. The combine 10 includes a housing 14, a plurality of ground-engaging members (e.g., wheels) 18 supporting the housing 14, and an operator cab 22 disposed at a front end of the housing 14. The combine 10 also includes a feederhouse 26 extending from the front end of the housing 14 generally underneath the operator cab 22 and a head 30 coupled to the feederhouse 26. The head 30 is configured to cut or pick up pre-cut crops and feed the crops into the feederhouse 26, which then draws the crops into the housing 14 (e.g., via a rotating feeder drum). Within the housing 14, harvested crops can be threshed to remove stalk material or straw via a separating system (not shown), leaving the crop grains that are to be collected. The crop grains may be further processed within the housing 14 (e.g., to remove chaff) and ultimately stored within and/or discharged from the housing 14. The threshing and processing of the crops can be accomplished by any one of a variety of mechanisms.

With continued reference to FIG. 1, the head 30 includes a frame 34 having a plurality of segments. In the illustrated embodiment, the frame 34 includes a center segment 38 coupled to the feederhouse 26, a left wing 42 coupled to the center segment 38, and a right wing 46 coupled to the center segment 38 opposite the left wing 42. Each of the segments 38, 42, 46 includes a cutter bar 50 and a conveying mechanism 54 that can carry cut crops toward the center of the head 30 for intake into the feederhouse 26. Each of the segments 38, 42, 46 also defines a longitudinal axis 38A, 42A, 46A extending centrally through the segment's lateral sides and parallel to the cutter bar 50.

In the illustrated embodiment, the head 30 is a draper head, and the conveying mechanism 54 of each segment includes a conveyor belt. In other embodiments, the conveying mechanisms 54 may include one or more rotatable augers, a combination of conveyor belts and augers, or any other means suitable for carrying crops toward the feederhouse 26. The illustrated head 30 also includes a rotatable reel 58 provided on each segment 38, 42, 46, such that the head 30 is configured for harvesting grain. In other embodiments, the head 30 may be any other type of agricultural head, such as a corn head, dummy headauger platform, belt pick up, and the like, and the segments 38, 42, 46 may not include reels 58.

Figure 2:
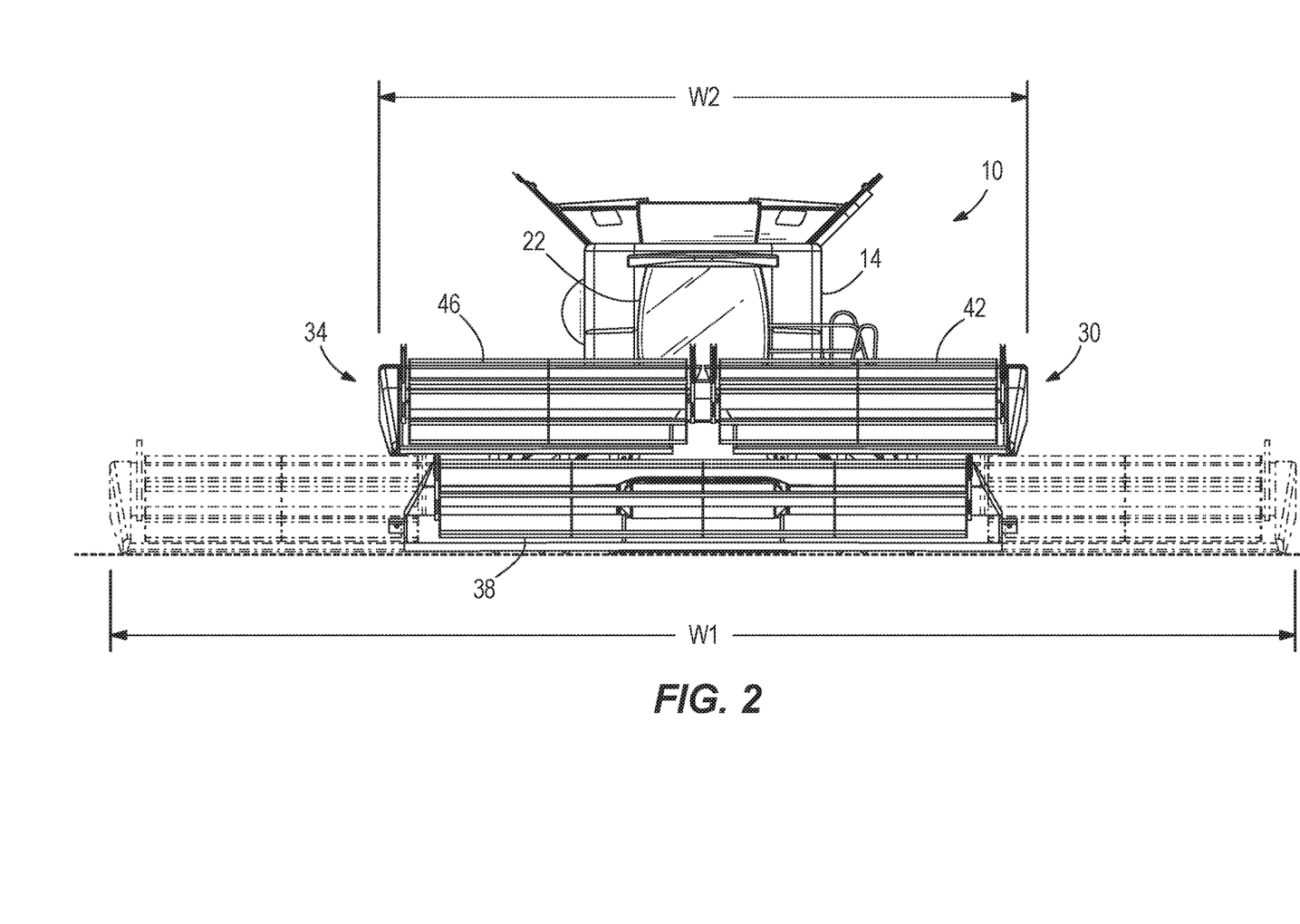
FIG. 2 is a front view of the agricultural machine of FIG. 1, illustrating the folding head in a deployed configuration and in a folded configuration.

Referring to FIG. 2, the left wing 42 and the right wing 46 are movable relative to the center segment 38 between a non-deployed or folded position (illustrated in solid lines in FIG. 2), defining a non-deployed or folded configuration of the head 30, and deployed position (illustrated in phantom lines in FIG. 2), defining a deployed configuration of the head 30. In some embodiments, the head 30 has an overall width W1 in the deployed configuration (measured from an outermost point of the left wing 42 to an outermost point of the right wing 46) between thirty-five feet and sixty feet. In other embodiments, the head 30 has an overall width W1 in the deployed configuration between forty-five feet and sixty feet. In other embodiments, the head 30 has an overall width W1 in the deployed configuration between fifty feet and sixty feet.

The head 30 has a maximum width W2 in the folded configuration that is less than the overall width W1 of the head 30 in the deployed configuration (FIG. 2). In some embodiments, the maximum width W2 may be defined by the outermost point on the left wing 42 and the outermost point on the right wing 46. In other embodiments, the maximum width W2 may be defined by outermost points of the center segment 38. In some embodiments, the head 30 has a maximum width W2 in the folded configuration between twenty feet and forty feet. In some embodiments, the head 30 has a maximum width W2 in the folded configuration between twenty feet and thirty feet. In some embodiments, a ratio of the maximum width W2 in the folded configuration to the overall length W1 in the deployed position is between 0.5 and 0.8.

Figure 3:
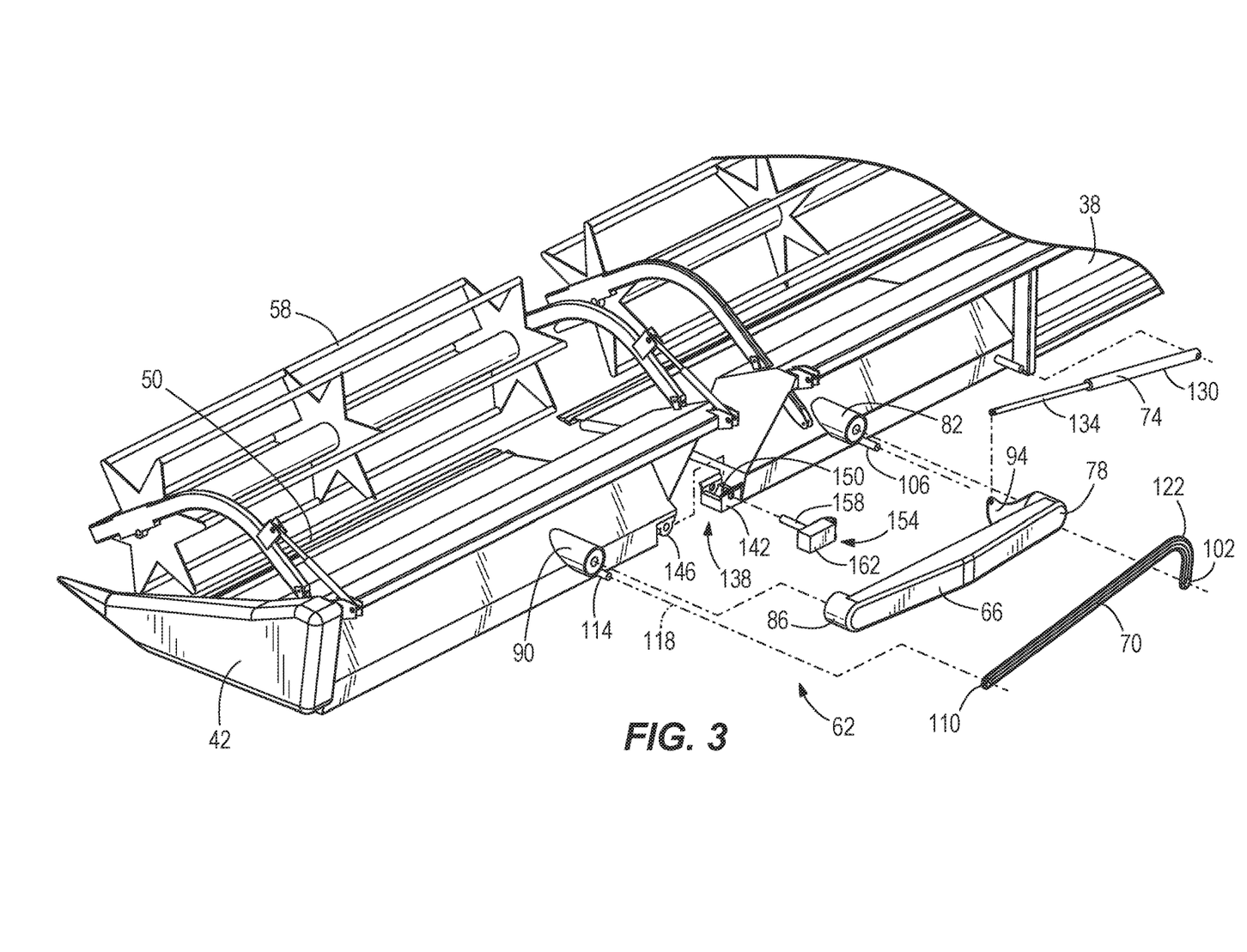
FIG. 3 is an exploded view of a motion control assembly of the folding head of FIG. 1.
Figure 4:
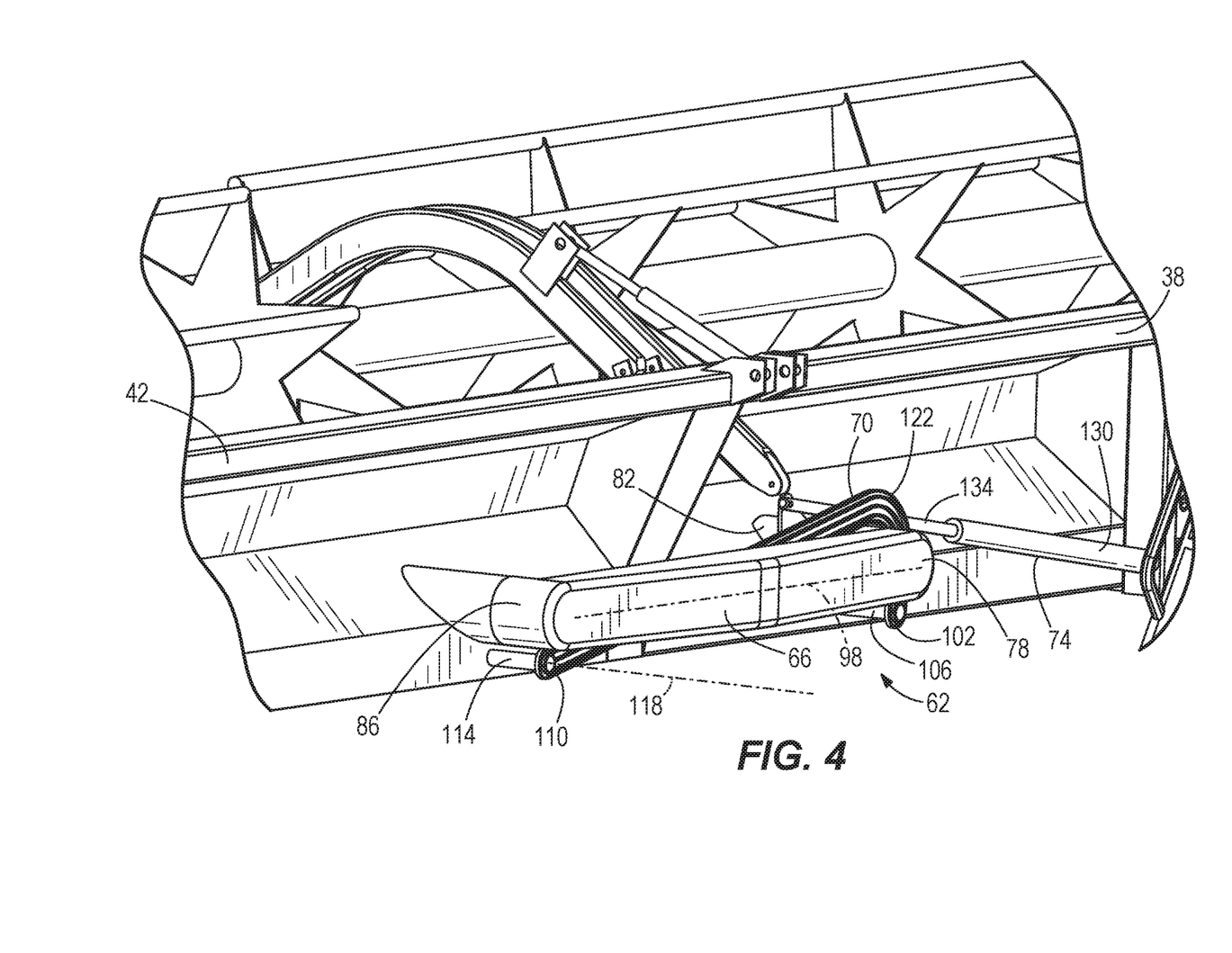
FIG. 4 is a perspective view of the motion control assembly of FIG. 3.

With reference to FIGS. 3 and 4, each of the wings 42, 46 is coupled to the center segment 38 by a motion control assembly 62. The motion control assembly 62 for the right wing 46 is substantially similar to the motion control assembly 62 for the left wing 42; accordingly, only the motion control assembly 62 for the left wing 42 is described in detail herein.

The illustrated motion control assembly 62 includes a first link 66, a second link 70, and an actuator 74. The first link 66 has a first end 78 pivotally coupled to a boss 82 on the center segment 38 and a second, opposite end 86 pivotally coupled to a boss 90 on the wing 42. An integrally-formed control tab 94 extends upward from the first link 66 between the first and second ends 78, 86, and the first link 66 defines a longitudinal axis 98 extending between the first and second ends 78, 86. The second link 70 has a first end 102 pivotally coupled to a post 106 on the center segment 38 and a second end 110 pivotally coupled to a post 114 on the wing 42 that defines a pin axis 118. In the illustrated embodiment, the second link 70 includes a curved portion 122 between its first and second ends 102, 110 such that the second link 70 is generally hook-shaped. The curved portion 122 embraces or wraps around at least a portion of the boss 82 on the center segment 38 and the first end 78 of the first link 66 when the wing 42 is in the deployed position (FIGS. 4 and 5A).

Figure 5A:
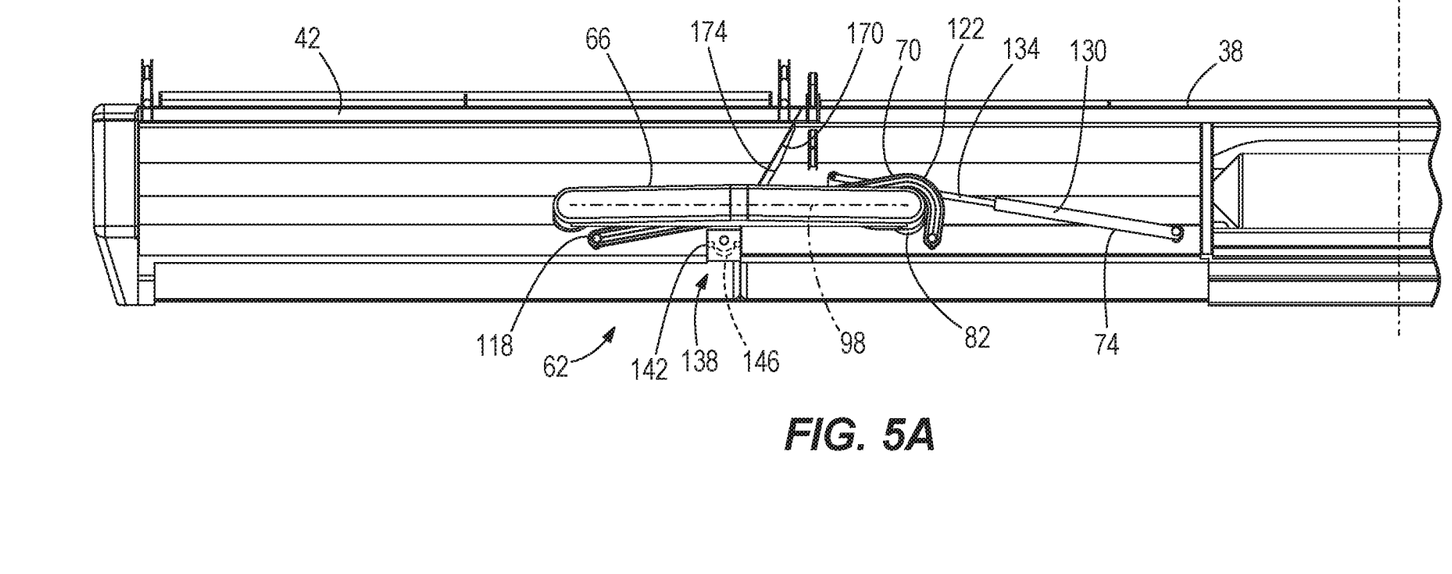
FIG. 5A-5D illustrate movement of a wing of the folding head from a deployed position to a non-deployed or folded position.

When the wing 42 is in the deployed position, the second link 70 crosses in front of the first link 66 such that the first link 66 overlies a portion of the second link 70 when viewed from the rear (FIG. 5A). As such, the pivot axis 118 of the second link 70 is offset to one side of the longitudinal axis 98 of the first link 66. When the wing 42 is in the folded position, however, the first link 66 does not overlie any portion of the second link 70 when viewed from the rear (FIG. 5D). As such, the pivot axis 118 of the second link 70 is offset to an opposite side of the longitudinal axis 98 of the first link 66. Thus, as the wing 42 moves from the deployed position (FIG. 5A) to the folded position (FIG. 5D), the pivot axis 118 of the second link 70 crosses the longitudinal axis 98 of the first link 66.

Referring to FIGS. 3 and 4, the illustrated actuator 74 is a hydraulic cylinder that includes a cylinder body 130 and a rod 134 displaceable relative to the cylinder body 130 in response to the introduction of pressurized hydraulic fluid into the cylinder body 130. The hydraulic cylinder 74 may be single acting or double acting. The cylinder body 130 is pivotally coupled to the center segment 38, and the rod 134 is pivotally coupled to the control tab 94 on the first link 66, at a position offset from the longitudinal axis 98. Accordingly, displacement of the rod 134 relative to the cylinder 130 drives the first link 66. Alternatively, the cylinder body 130 may be pivotally coupled to the control tab 94, and the rod 134 may be pivotally coupled to the center segment 38. In other embodiments, the motion control assembly 62 may include other types of actuators, such as pneumatic or electronic actuators.

Best illustrated in FIG. 3, the head 30 further includes a releasable pivot assembly 138. The releasable pivot assembly 138 includes a saddle 142 disposed on the center segment 38 and a projection 146 disposed on the wing 42 that is received within an open recess 150 defined by the saddle 142 to form a pivoting connection when the wing 42 is in the deployed position. As such, the wing 42 can pivot relative to the center segment 38 about the releasable pivot assembly 138 when the wing 42 is in the deployed position. This is referred to as ground contouring. The cutter bar 50 on the wing 42 is kept closer to the ground because the wing 42 can pivot to compensate for varied terrain. In other embodiments, the saddle 142 may be located on the wing 42, and the projection 146 may be located on the center segment 38.

With continued reference to FIG. 3, the releasable pivot assembly 138 includes a latch mechanism 154 to selectively lock the projection 146 into pivoting engagement with the saddle 142 and inhibit removal of the projection 146 from the saddle recess 150. In the illustrated embodiment, the latch mechanism 154 includes a displaceable pin 158 that is movable between a latched position in which the pin 158 extends through the projection 146 and the saddle 142 and an unlatched position in which the pin 158 is at least partially withdrawn so as to permit the projection 146 to be removed from the saddle recess 150. When the pin 158 is in the latched position, the wing 42 is pivotable about the pin 158 relative to the center segment 38 to permit ground contouring.

The illustrated latch mechanism 154 includes an actuator 162 to displace the pin 158 between the latched position and the unlatched position. The actuator 162 can include any hydraulic, pneumatic, or electronic (e.g., solenoid) assembly suitable for displacing the pin 158. In some embodiments, additional releasable pivot assemblies (not shown) may be provided to selectively disengage one or both of the first and second links 66, 70 from either or both the center segment 38 and the wing 42 when the latch mechanism 154 is in the latched position.

In some embodiments, the projection 146 may be a cylindrical member configured to pivot directly within the recess 150 of the saddle 142. In such embodiments, the latch mechanism 154 does not include the pin 158. Rather, the latch mechanism 154 includes a gate that secures the projection 146 within the recess 150 when in the latched position and permits the projection 146 to be inserted into or removed from the recess 150 when in the unlatched position.

Figure 5B:
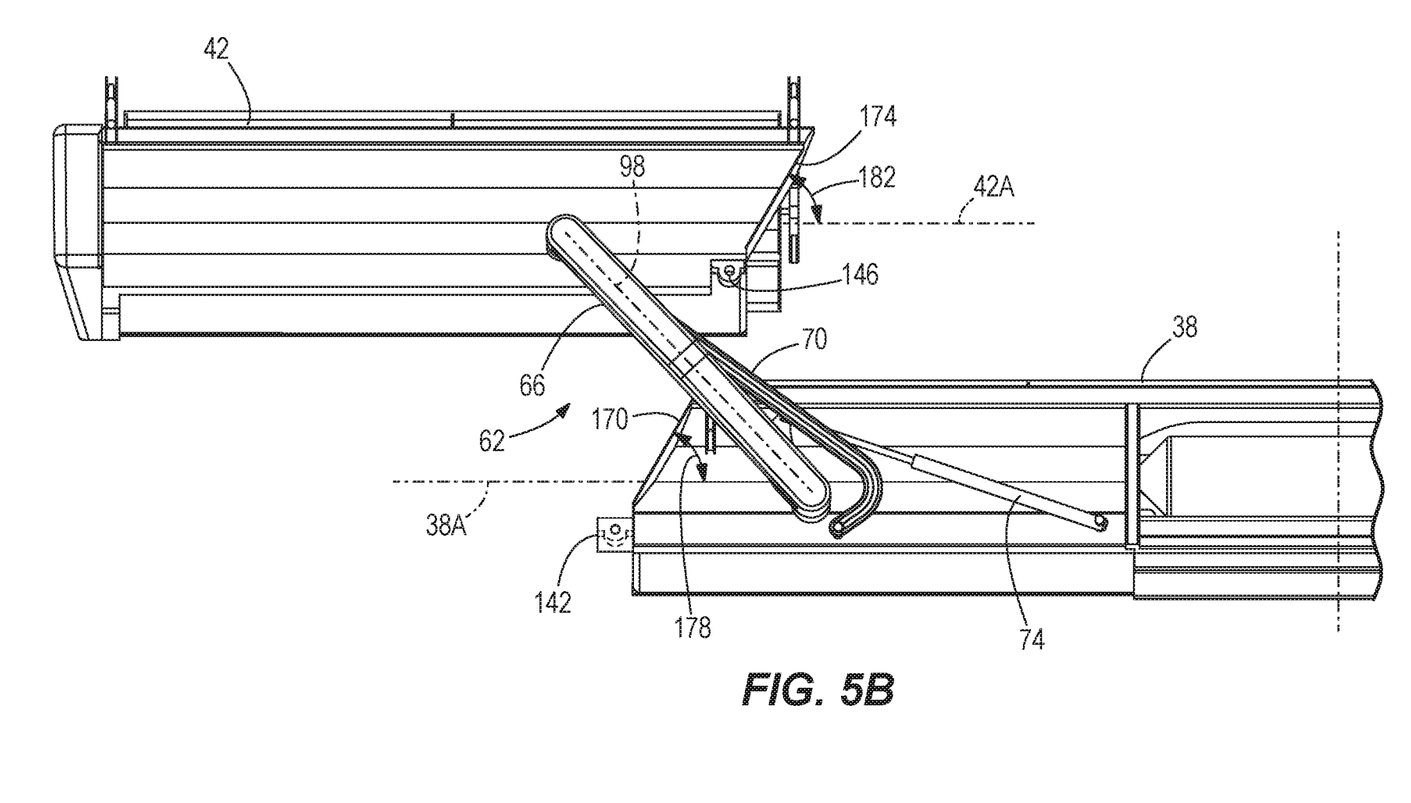
Figure 5C:
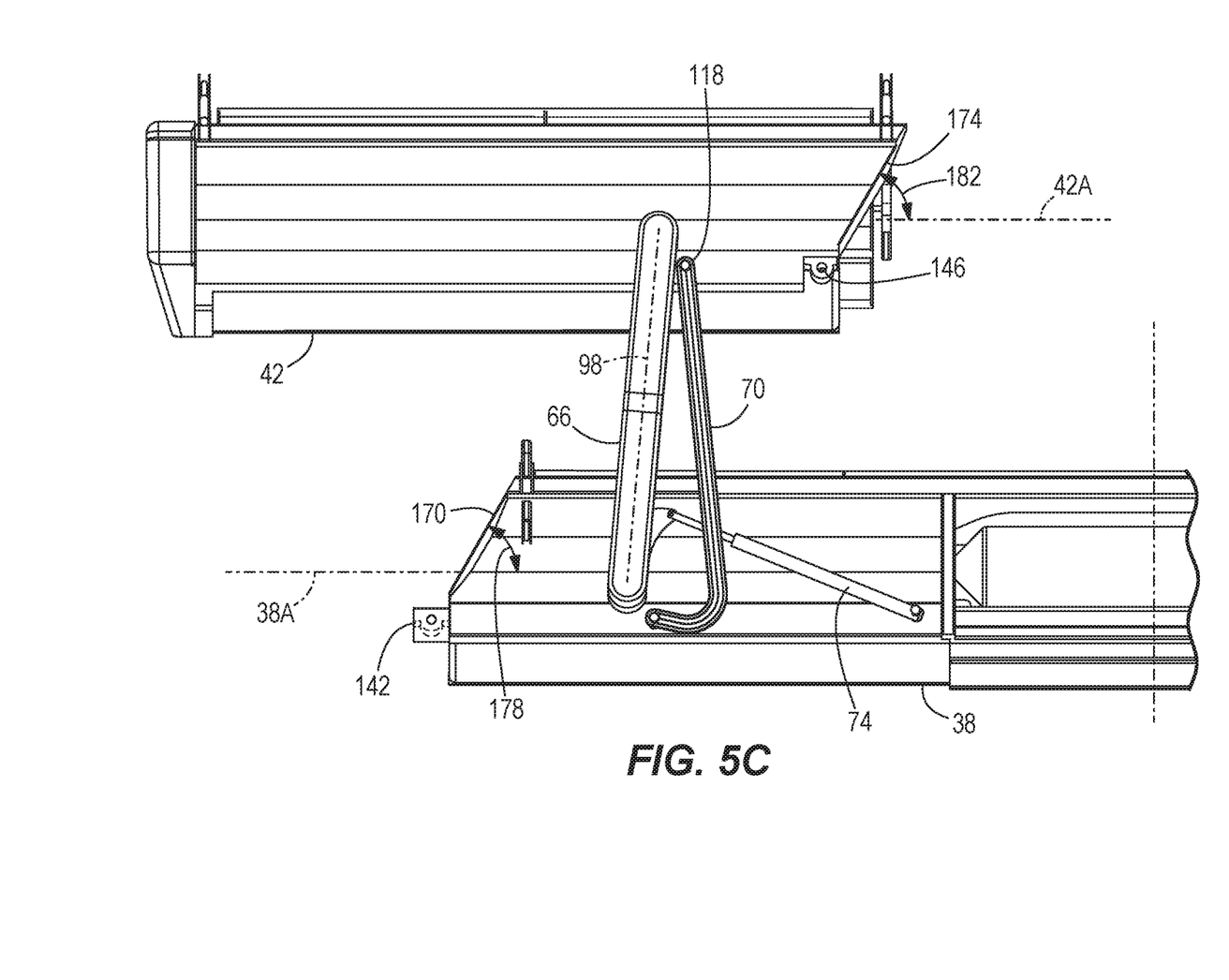
Figure 5D:
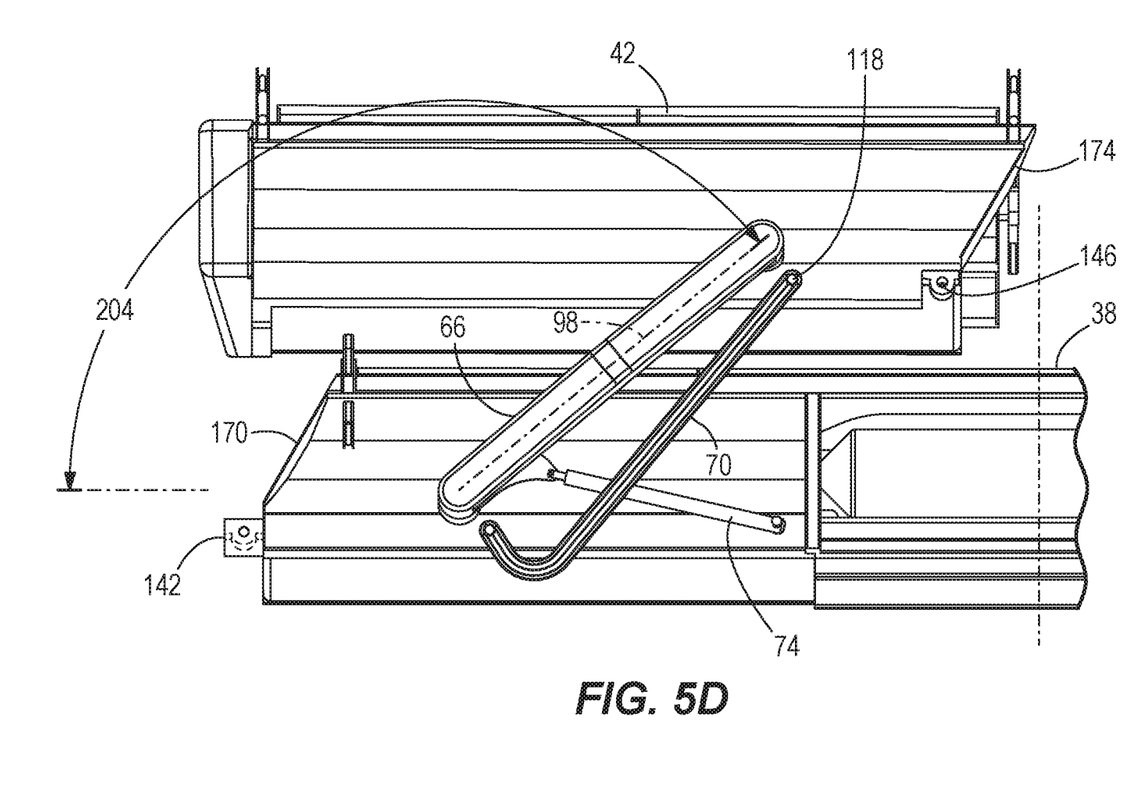

Best illustrated in FIGS. 5B and 5C, the center segment 38 includes a first end surface 170 and the wing 42 includes a second end surface 174. The first end surface 170 is oriented so as to define a first oblique included angle 178 between the first end surface 170 and the longitudinal axis 38A of the center segment 38. Similarly, the second end surface 174 is oriented so as to define a second oblique included angle 182 between the second end surface 174 and the longitudinal axis 42A of the wing 42. In the illustrated embodiment, the first oblique included angle 178 is equal in magnitude to the second oblique included angle 182. In some embodiments, the angles 178, 182 are between 30 degrees and 80 degrees. In other embodiments, the angles 178, 182 are between 45 degrees and 70 degrees. In other embodiments, the angles 178, 182 are between 55 degrees and 65 degrees. In the illustrated embodiment, the angles 178, 182 are 60 degrees. In some embodiments, the first and second angles 178, 182 may not be equal. For example, the second oblique included angle 182 may be greater than the first oblique included angle 178 so that the end surfaces 170, 174 diverge. This provides clearance for the wing 42 to pivot relative to the center segment 38 (about the pivot assembly 138) for ground contouring.

When the wing 42 is in the deployed position (FIG. 5A), the first end surface 170 is positioned adjacent the second end surface 174 and faces the second end surface 174. As used in this context, the term "adjacent" means that the first end surface 170 has at least one point that is within six inches of at least one point on the second end surface 174. When the wing 42 is in the folded position (FIG. 5D), the first end surface 170 is positioned remote from the second end surface 174 and faces away from the second end surface 174. As used in this context, the term "remote" means that the first end surface 170 has at least one point that is more than two feet away from every point on the second end surface 174.

With reference to FIG. 1, the illustrated combine 10 includes a controller 200, which may include a plurality of electrical and electronic components that provide power, operational control, and protection to the components and modules within the controller 200. For example, the controller 200 may include an electronic processor or central processing unit (e.g., a programmable microprocessor, microcontroller, or similar device), non-transitory, machine-readable memory, and an input/output interface. Software for controlling various aspects of the operation of the combine 10 can be stored in the memory of the controller 200. The software includes, for example, firmware, one or more applications, program data, filters, rules, one or more program modules, and other executable instructions. The controller 200 may be configured to retrieve from memory and execute, among other things, instructions related to the control processes and methods described herein. The controller 200 may also include one or more mechanical or electro-mechanical components, such as steering, throttle, and braking controls. In other embodiments, the controller 200 may include additional, fewer, or different components.

The controller 200 is in communication with the actuator 74 of each motion control assembly 62 and with the actuator 162 of each latch mechanism 154. Accordingly, the controller 200 is capable of sending signals or commands (in the form of wired or wireless communication, hydraulic pressure, pneumatic pressure, or in a combination of forms) to control actuation of the motion control assemblies 62 and the latch mechanisms 154 in response to user commands, or, in some embodiments, automatically.

In operation, when the head 30 is in the deployed configuration and the combine 10 is operating on level ground, the longitudinal axes 38A, 42A, 46A of the center segment 38 and the wings 42, 46 are substantially aligned (FIG. 1). The projection 146 of the releasable pivot assembly 138 is received within the saddle 142, and the latch mechanism 154 for each wing 42, 46 is maintained in the latched position (FIGS. 3 and 5A). Accordingly In some embodiments (e.g., where clearance is provided between the end surfaces 170, 174), one or both of the wings 42, 46 may pivot about its respective releasable pivot assembly 138 to provide ground contouring if the head 30 encounters sloped terrain, one or both of the wings 42, 46 may pivot downwardly about its respective releasable pivot assembly 138 to provide ground contouring. In some embodiments, the first surface 170 and second surface 174 may be shaped to permit one or both of the wings 42, 46 to also pivot upwardly about the releasable pivot assemblies 138 to provide a greater degree of ground contouring.

When an operator desires to place the head 30 in the folded configuration (e.g., when transporting the combine 10), the controller 200 first actuates each latch mechanism 154 to move to the unlatched position, allowing the projection 146 to be removed from the saddle recess 150. Next, the controller 200 commands the actuator 74 of each motion control assembly 62 to move its associated wing 42 to the folded position shown in FIG. 5D. The links 66, 70, the center segment 38, and the wing 42 function as a four-bar linkage such that the longitudinal axis 42A, 46A of each wing 42, 46 is maintained in a parallel relationship with the longitudinal axis 38A of the center segment as the wings 42, 46 move between the deployed position and the folded position (e.g., FIGS. 5B and 5C). In addition, each wing 42, 46 moves to the folded position along a continuous arc 204 (FIG. 5D). The obliquely angled end surfaces 170, 174 at the interface between the center segment 38 and each wing 42, 46 advantageously allow the projection 146 to lift out of the saddle recess 150 as each wing 42, 46 begins to move, without requiring any separate linear motion of the wing 42, 46. In some embodiments, the wings 42, 46 may be moved to their folded positions independently of one another. In other embodiments, the wings 42, 46 may be moved to their folded positions simultaneously.

To return the head 30 to the deployed configuration, the controller 200 commands the actuator 74 of each motion control assembly 62 to move its associated wing 42, 46 to the deployed position. Each wing 42, 46 moves to the deployed position along the continuous arc 204, and the projection 146 on each wing 42, 46 drops into its associated saddle recess 150 when the wing 42, 46 reaches the deployed position. The controller 200 may then actuate each latch mechanism 154 to the latched position.

Various features of the disclosure are set forth in the following claims.

What is claimed is:

1. A head for an agricultural machine, the head comprising:
   a frame including a center segment defining a first longitudinal axis and a wing defining a second longitudinal axis; and
   a motion control assembly connecting the center segment and the wing such that the wing is movable relative to the center segment between a deployed position and a non-deployed position,
   wherein the motion control assembly is configured to maintain the second longitudinal axis in a parallel relationship with the first longitudinal axis as the wing moves between the deployed position and the non-deployed position, and
   wherein the wing is movable from the deployed position to the non-deployed position along a continuous arc.

2. The head of claim 1, wherein the center segment includes a first end surface, wherein the wing includes a second end surface, and wherein the first end surface is adjacent the second end surface in the deployed position of the wing.

3. The head of claim 2, wherein the first end surface is remote from the second end surface in the non-deployed position of the wing.

4. The head of claim 2, wherein the first end surface and the first longitudinal axis define a first oblique included angle, and wherein the second end surface and the second longitudinal axis define a second oblique included angle.

5. The head of claim 4, wherein the first and second oblique included angles are equal such that the first end surface is parallel to the second end surface when the first longitudinal axis is parallel to the second longitudinal axis.

6. The head of claim 1, wherein the motion control assembly includes a first link and a second link, each link having a first end pivotally coupled to the center segment and a second end pivotally coupled to the wing such that the center segment, the wing, and the first and second links define a four-bar linkage.

7. The head of claim 1, further comprising a releasable pivot assembly configured to selectively pivotally couple the wing to the center segment.

8. The head of claim 7, wherein in the releasable pivot assembly includes a projection located on one of the wing and the center segment, and a saddle located on the other of the wing and the center segment, wherein the saddle includes a recess configured to receive the projection when the wing is in the deployed position, and wherein the projection is not received in the recess when the wing is in the folded position.

9. The head of claim 8, wherein the releasable pivot assembly includes a latch mechanism movable between a latched position and an unlatched position, and wherein the latch mechanism is configured to retain the projection within the recess when the latch mechanism is in the latched position.

10. The head of claim 9, wherein the latch mechanism is configured to move to the unlatched position before the wing moves from the deployed position toward the non-deployed position.

11. A combine comprising:
a housing;
a feederhouse coupled to a front end of the housing;
a head coupled to the feederhouse, the head including a frame having a center segment that defines a first longitudinal axis and includes a first end surface, and a wing that defines a second longitudinal axis and includes a second end surface; and
a motion control assembly connecting the center segment and the wing such that the wing is movable relative to the center segment between a deployed position and a non-deployed position,
wherein the first end surface faces the second end surface when the wing is in the deployed position and faces away from the second end surface when the wing is in the non-deployed position,
wherein the first end surface and the first longitudinal axis define a first oblique included angle, and
wherein the second end surface and the second longitudinal axis define a second oblique included angle.

12. The combine of claim 11, wherein the first and second oblique included angles are equal such that the first end surface is parallel to the second end surface when the first longitudinal axis is parallel to the second longitudinal axis.

13. The combine of claim 11, wherein the motion control assembly includes a first link and a second link, each having a first end pivotally coupled to the center segment and a second end pivotally coupled to the wing such that the center segment, the wing, and the first and second links define a four-bar linkage.

14. The combine of claim 13, wherein the first link defines a third longitudinal axis extending between the first end and the second end of the first link, wherein the second end of the second link is pivotal about a pin axis, and wherein the pin axis crosses the third longitudinal axis when the wing moves from the deployed position to the non-deployed position.

15. The combine of claim 13, wherein the second link includes a curved portion.

16. A head for an agricultural machine, the head comprising:
a frame including a center segment and a wing; and
a motion control assembly connecting the center segment and the wing such that the wing is movable relative to the center segment between a deployed position and a non-deployed position; and
a releasable pivot assembly selectively pivotally coupling the wing and the center segment when the wing is in the deployed position, the releasable pivot assembly including
a projection located on one of the wing and the center segment, and
a saddle located on the other of the wing and the center segment, the saddle having a recess configured to receive the projection when the wing is in the deployed position,
wherein the projection is insertable into the recess and removable from the recess without linearly translating the wing relative to the center segment.

17. The head of claim 16, further comprising a latch mechanism movable between a latched position and an unlatched position, wherein the latch mechanism is configured to retain the projection within the recess when the latch mechanism is in the latched position, and wherein the latch mechanism is configured to move to the unlatched position before the wing moves from the deployed position toward the non-deployed position.

18. The head of claim 16, wherein the motion control assembly includes a first link and a second link, each having a first end pivotally coupled to the center segment and a second end pivotally coupled to the wing such that the center segment, the wing, and the first and second links define a four-bar linkage.

19. The head of claim 18, wherein the motion control assembly includes a hydraulic actuator extending between the first link and the center segment, the hydraulic actuator operable to pivot the first link to move the wing between the deployed position and the non-deployed position.

20. The head of claim 18, wherein the first link defines a longitudinal axis extending between the first end and the second end of the first link, wherein the second end of the second link is pivotal about a pin axis, and wherein the pin axis crosses the longitudinal axis when the wing moves from the deployed position to the non-deployed position.

* * * * *